US00RE46971E

(19) United States
(12) Reissued Patent
Neumann

(10) Patent Number: US RE46,971 E
(45) Date of Reissued Patent: Jul. 31, 2018

(54) FLEXIBLE SKID STEER ATTACHMENT DEVICE

(71) Applicant: Duane A. Neumann, Jefferson, WI (US)

(72) Inventor: Duane A. Neumann, Jefferson, WI (US)

(21) Appl. No.: 14/560,816

(22) Filed: Dec. 4, 2014

Related U.S. Patent Documents

Reissue of:
(64) Patent No.: 8,322,947
Issued: Dec. 4, 2012
Appl. No.: 12/813,770
Filed: Jun. 11, 2010

(51) Int. Cl.
*E01C 19/00* (2006.01)
*E01C 19/20* (2006.01)

(52) U.S. Cl.
CPC ..... *E01C 19/2045* (2013.01); *E01C 19/00* (2013.01); *E01C 19/20* (2013.01); *E01C 19/201* (2013.01); *E01C 2019/2085* (2013.01)

(58) Field of Classification Search
None
See application file for complete search history.

(56) References Cited

U.S. PATENT DOCUMENTS 1,370,815 A * 3/1921 Henderson ..... E01C 23/065 404/77
1,510,051 A * 9/1924 Forbes ..... B65G 39/16 198/808
1,879,232 A * 9/1932 Henry ..... B65G 39/10 198/829
2,342,863 A * 2/1944 Hlavaty ..... F16C 19/54 474/106
2,588,725 A * 3/1952 Hogan ..... D01G 25/00 156/474
2,653,700 A * 9/1953 Sloane ..... B65G 39/16 198/808
2,727,400 A * 12/1955 Lorig ..... B24B 21/00 474/123
2,728,445 A * 12/1955 Erickson ..... B65G 23/00 198/835
2,786,635 A * 3/1957 Oishi ..... B29B 17/02 209/127.4
2,793,875 A * 5/1957 Quayle ..... B66F 9/07586 16/44
2,797,794 A * 7/1957 Bradley ..... B65G 39/16 198/806
2,878,926 A * 3/1959 Harty ..... B65G 45/12 198/497
2,966,065 A * 12/1960 Renner ..... B65G 39/071 193/37
2,971,631 A * 2/1961 Gray ..... B65G 67/00 198/303
3,012,992 A * 12/1961 Pigott ..... C08G 18/10 525/440.09

(Continued)

OTHER PUBLICATIONS

Zegeer, et al.—The Effect of Lane and Shoulder Widths On Accident Reductions On Rural, Two-Lane Roads—Research Report 561 Oct. 1980.*

*Primary Examiner* — Glenn K Dawson
(74) *Attorney, Agent, or Firm* — Boyle Fredrickson, S.C.

(57) ABSTRACT

The present invention is a flexible skid steer road widening and shouldering attachment device with an adjustable spreader system which gives the operator precise control over the placement of debris.

20 Claims, 7 Drawing Sheets

(56) References Cited

U.S. PATENT DOCUMENTS 3,015,261 A * 1/1962 MacDonald ..... E01C 19/15 37/235
3,016,809 A * 1/1962 McNeill ..... E01C 19/21 239/119
RE25,151 E * 4/1962 Renner ..... B65G 39/071 198/832
3,122,935 A * 3/1964 Morling ..... B65G 39/071 198/840
3,127,854 A * 4/1964 Reisman ..... A21B 1/48 198/815
3,193,086 A * 7/1965 Wilhelm ..... B65G 39/16 198/807
3,233,613 A * 2/1966 Korber ..... A24C 5/36 131/907
3,240,320 A * 3/1966 Poundstone ..... B65G 21/04 198/825
3,253,698 A * 5/1966 Murphy ..... B65G 15/60 198/637
3,437,192 A * 4/1969 Cauffman ..... A01K 5/0208 119/57.7
3,541,934 A * 11/1970 Hughes ..... E01C 19/185 404/120
3,545,599 A * 12/1970 Barber ..... B65G 39/16 198/807
3,650,375 A * 3/1972 Fleischauer ..... B65G 47/263 198/790
3,687,273 A * 8/1972 Macone ..... B65G 39/16 198/806
3,710,927 A * 1/1973 Alsted ..... B65G 39/16 198/807
3,719,098 A * 3/1973 Graves ..... B65G 23/06 474/153
3,872,686 A * 3/1975 Patrie ..... F25D 19/00 62/237
3,997,938 A * 12/1976 Pinaire ..... B60B 33/0028 16/45
4,068,969 A * 1/1978 Beach ..... E01C 19/4886 404/104
4,093,252 A * 6/1978 Rue ..... A63C 17/0033 280/87.042
4,230,222 A * 10/1980 Clark ..... B65G 45/26 198/494
4,283,810 A * 8/1981 Demrick ..... B60B 33/0002 16/47
4,351,084 A * 9/1982 Fontana ..... B60B 33/0028 16/45
4,369,878 A * 1/1983 Millevoi ..... B65G 39/16 198/807
4,576,391 A * 3/1986 Gerstner ..... B60B 33/0002 16/30
4,674,626 A * 6/1987 Adcock ..... B65G 15/60 198/720
4,679,662 A * 7/1987 Nordskog ..... B60B 33/0028 16/35 R
4,793,022 A * 12/1988 Raffaeli ..... B60B 33/00 16/45
4,871,025 A * 10/1989 Mayfield ..... E02F 3/7663 172/4.5
4,892,155 A 1/1990 Wanamaker ..... E02F 3/7622 172/199
4,936,392 A 6/1990 Kitchin ..... E02F 3/962 172/815
5,098,252 A 3/1992 Sheesley et al. ..... E02F 3/3627 172/273
5,117,885 A * 6/1992 Crawford ..... B60B 33/0028 152/323
5,219,063 A * 6/1993 Wyatt ..... B65G 39/16 198/840
5,402,874 A * 4/1995 Dahlin ..... B65G 21/10 198/300
5,511,908 A * 4/1996 Van Valkenburgh . B65F 1/1426 206/386
5,586,604 A * 12/1996 Postema ..... A01B 45/02 172/21
5,599,135 A 2/1997 Delaurenti ..... E01C 19/187 172/815
5,701,693 A 12/1997 Brocious et al. ..... E01H 1/003 172/305
H001767 H * 1/1999 Davis ..... F41A 23/26 89/40.01
5,895,173 A 4/1999 O'Brien et al. ..... E01C 19/21 404/108
5,902,090 A * 5/1999 Young ..... B60P 1/38 198/570
5,980,189 A * 11/1999 Rubner ..... B65G 41/002 198/550.13
6,115,882 A * 9/2000 Miles ..... B60B 33/0002 16/37
6,203,244 B1 * 3/2001 Van Ornum ..... E01C 19/15 404/101
6,220,811 B1 * 4/2001 Bernecker ..... A01D 87/12 294/107
6,241,078 B1 * 6/2001 Mott ..... B65G 39/071 198/806
6,315,105 B1 * 11/2001 Gibbs ..... B65G 45/12 198/497
6,367,177 B1 * 4/2002 Mullen ..... E02F 5/223 172/245
6,386,822 B1 5/2002 Burr ..... E02F 3/3609 37/468
6,390,289 B1 * 5/2002 Hoggan ..... B65G 15/08 198/806
6,560,904 B2 5/2003 Guggino ..... E01H 5/065 37/233
6,569,046 B1 * 5/2003 Gregg ..... F16G 1/28 474/102
6,619,881 B1 * 9/2003 Harvey ..... E01C 23/098 404/107
6,619,882 B2 * 9/2003 Harvey ..... 404/107
6,702,208 B1 * 3/2004 Hadler et al. ..... A01C 17/001 239/650
6,902,320 B2 * 6/2005 McKenna ..... A61B 6/0442 378/208
7,033,106 B2 * 4/2006 Harvey ..... E01C 23/098 404/107
7,059,467 B2 * 6/2006 Sands ..... B65G 15/42 198/606
7,273,111 B2 9/2007 Johnson ..... E02F 3/815 172/684.5
7,296,675 B1 * 11/2007 Shuttleworth ..... B65G 39/08 198/690.1
7,467,708 B2 * 12/2008 McGettigan ..... B65G 15/32 198/812
7,482,928 B2 * 1/2009 Brackmann ..... B60P 3/03 180/290
7,540,687 B2 6/2009 Neumann ..... E01C 19/182 108/110
7,546,920 B1 * 6/2009 Horn ..... F41C 33/06 206/317
8,016,311 B1 * 9/2011 Hadzicki ..... B62K 3/005 280/267
8,297,879 B1 * 10/2012 Schmidt ..... E01C 19/4873 172/811
8,322,947 B2 * 12/2012 Neumann ..... E01C 19/15 404/101
8,403,594 B2 * 3/2013 Neumann ..... E01C 19/15 404/101
2003/0136646 A1 * 7/2003 Powell ..... B65G 39/16 198/807
2003/0215288 A1 * 11/2003 Causie ..... E01C 19/185 404/104
2004/0131159 A1 * 7/2004 McKenna ..... A61B 6/0442 378/209
2004/0173654 A1 * 9/2004 McAlister ..... B60D 1/52 224/519
2007/0201952 A1 * 8/2007 Neumann ..... 404/104
2008/0139979 A1 * 6/2008 Talish ..... A61H 1/001 601/51

(56) References Cited

U.S. PATENT DOCUMENTS

| | | | | |
|---|---|---|---|---|
| 2008/0277221 | A1* | 11/2008 | Josefson | A45C 5/14<br>190/18 A |
| 2009/0194959 | A1* | 8/2009 | Mintie et al. | B62B 3/02<br>280/47.131 |
| 2010/0209190 | A1* | 8/2010 | Munz et al. | E01C 19/48<br>404/118 |

* cited by examiner

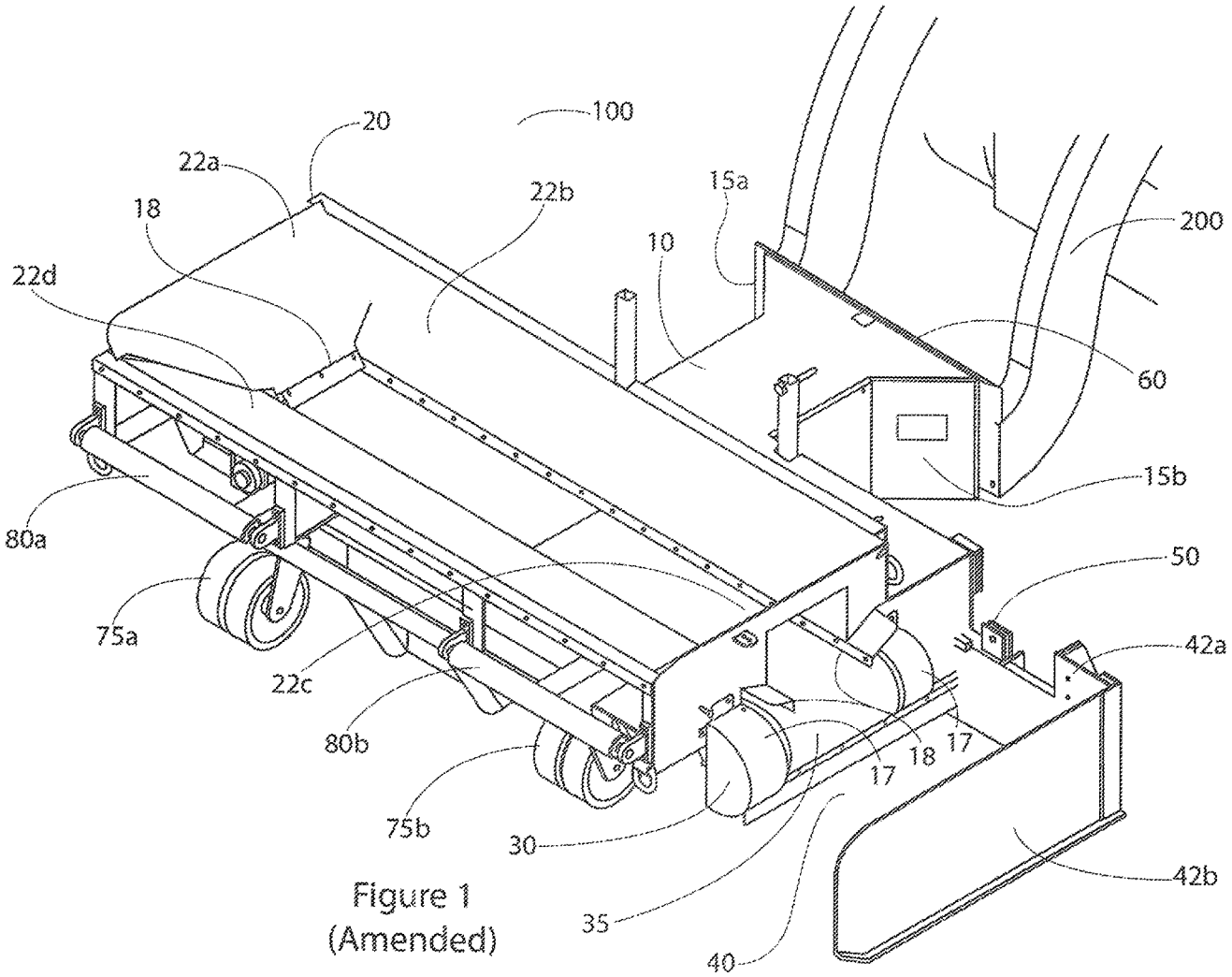
Figure 1
(Amended)

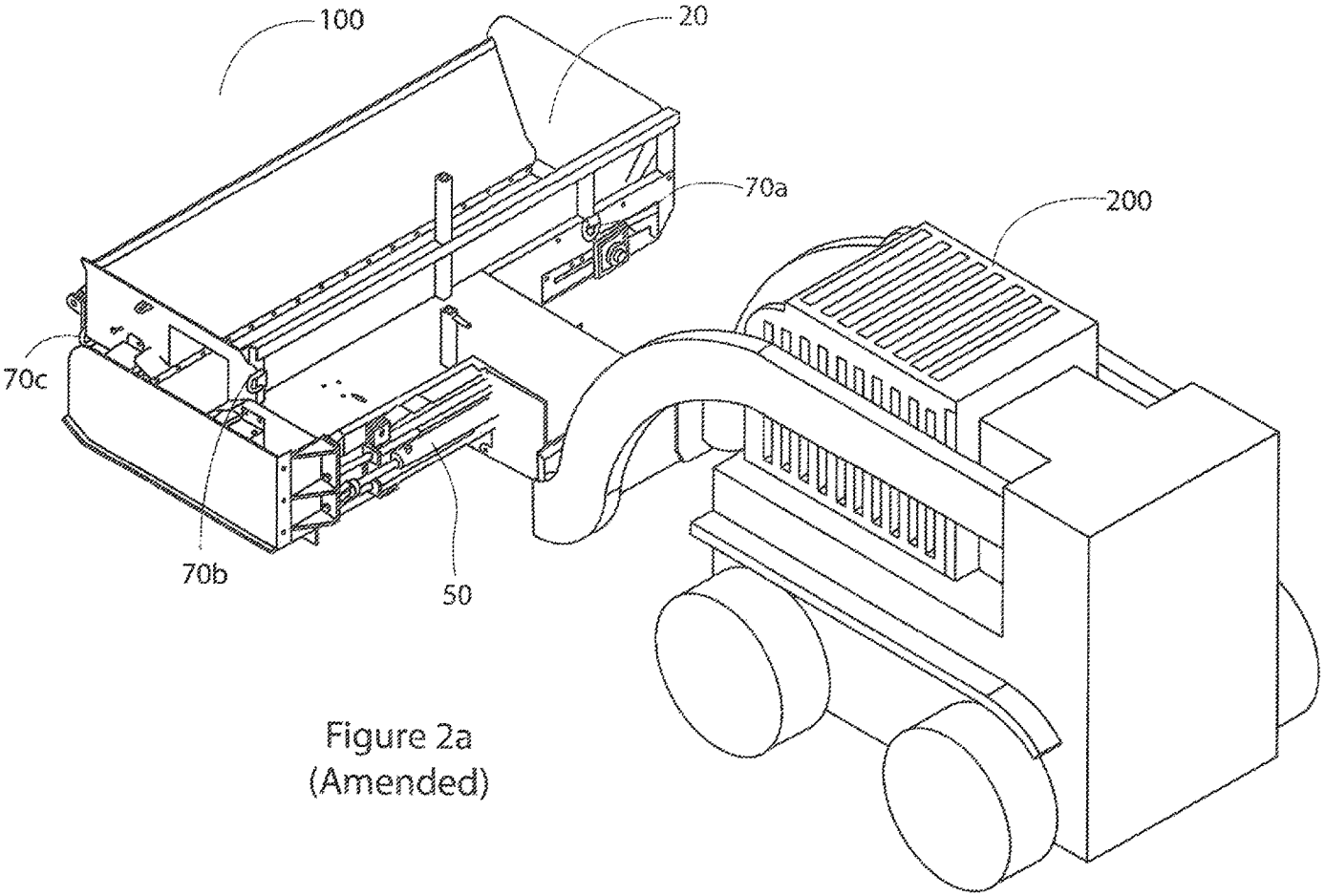
Figure 2a
(Amended)

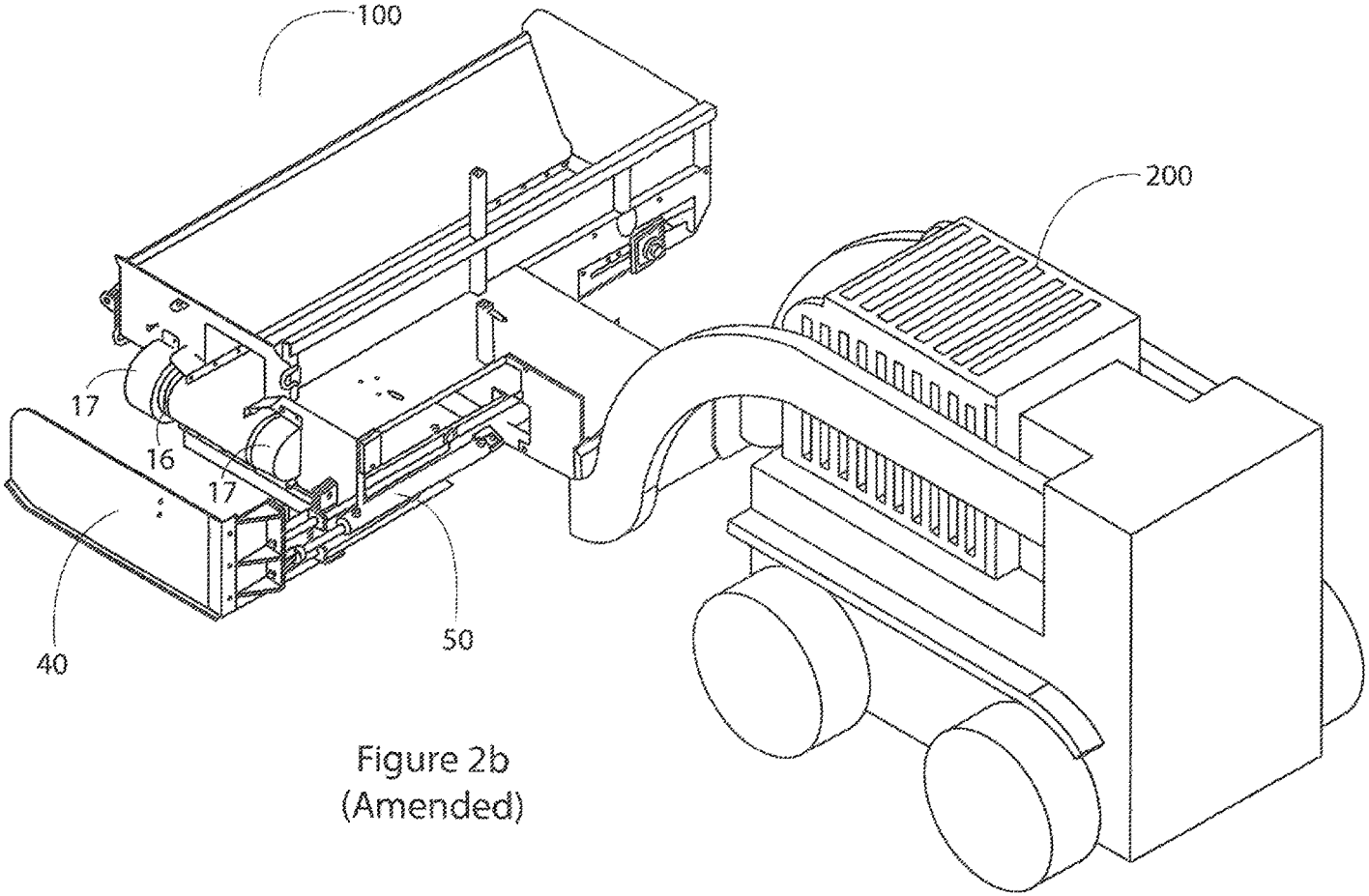
Figure 2b
(Amended)

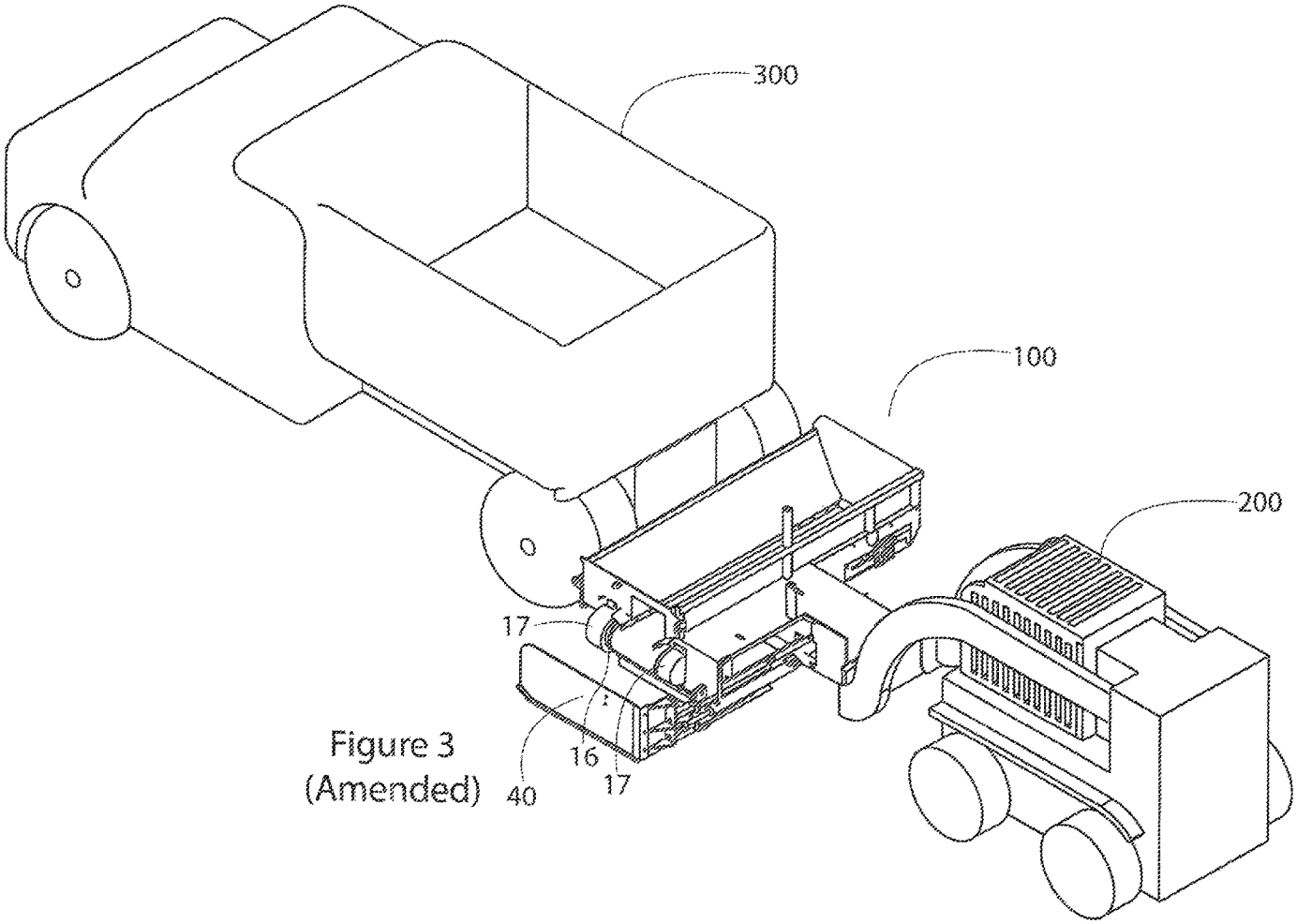
Figure 3
(Amended)

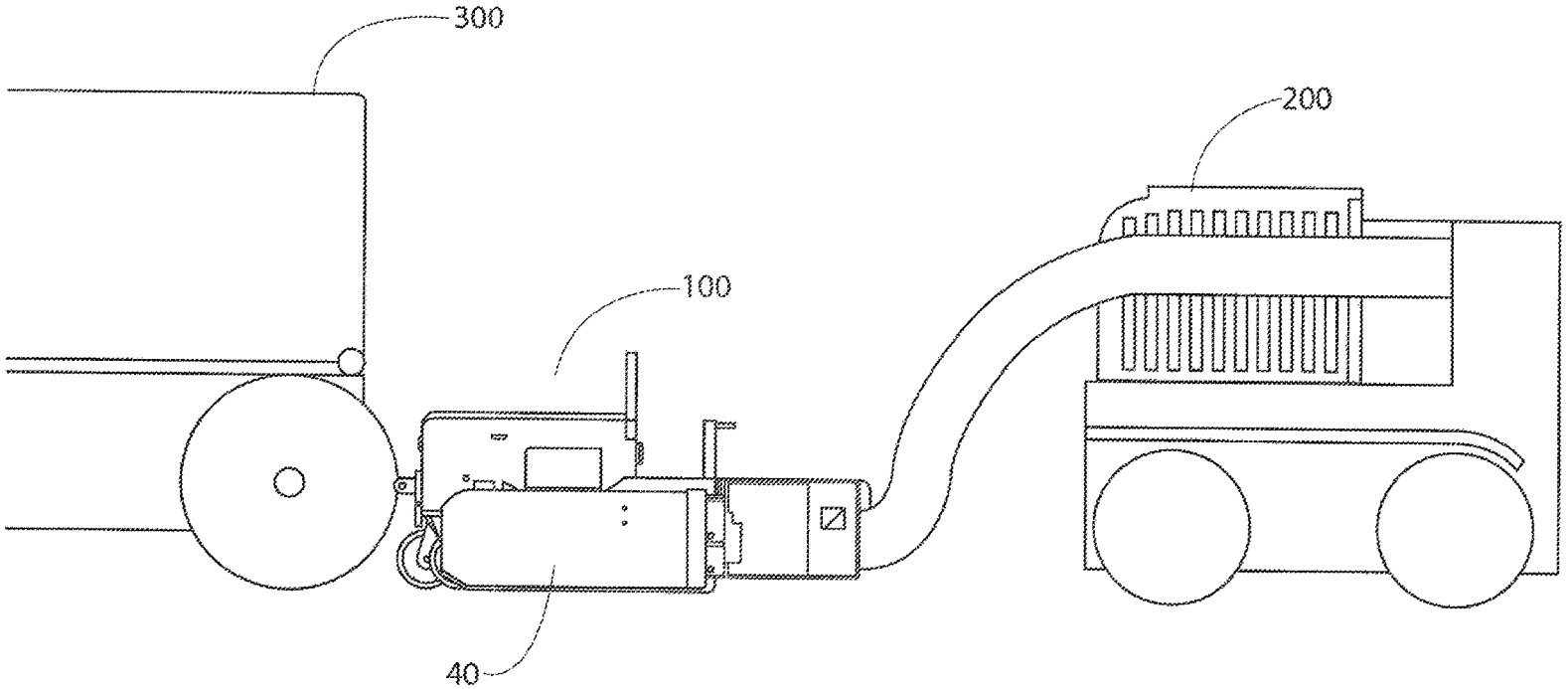
Figure 4
(Amended)

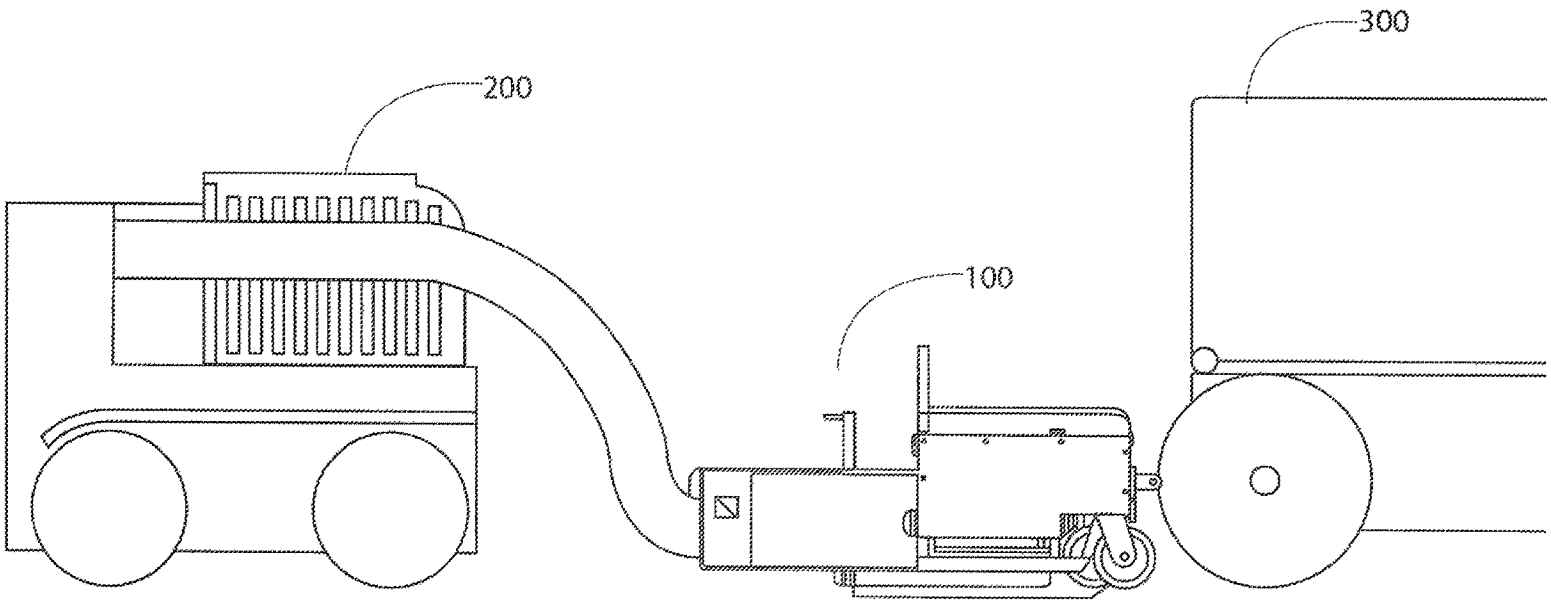
Figure 5
(Amended)

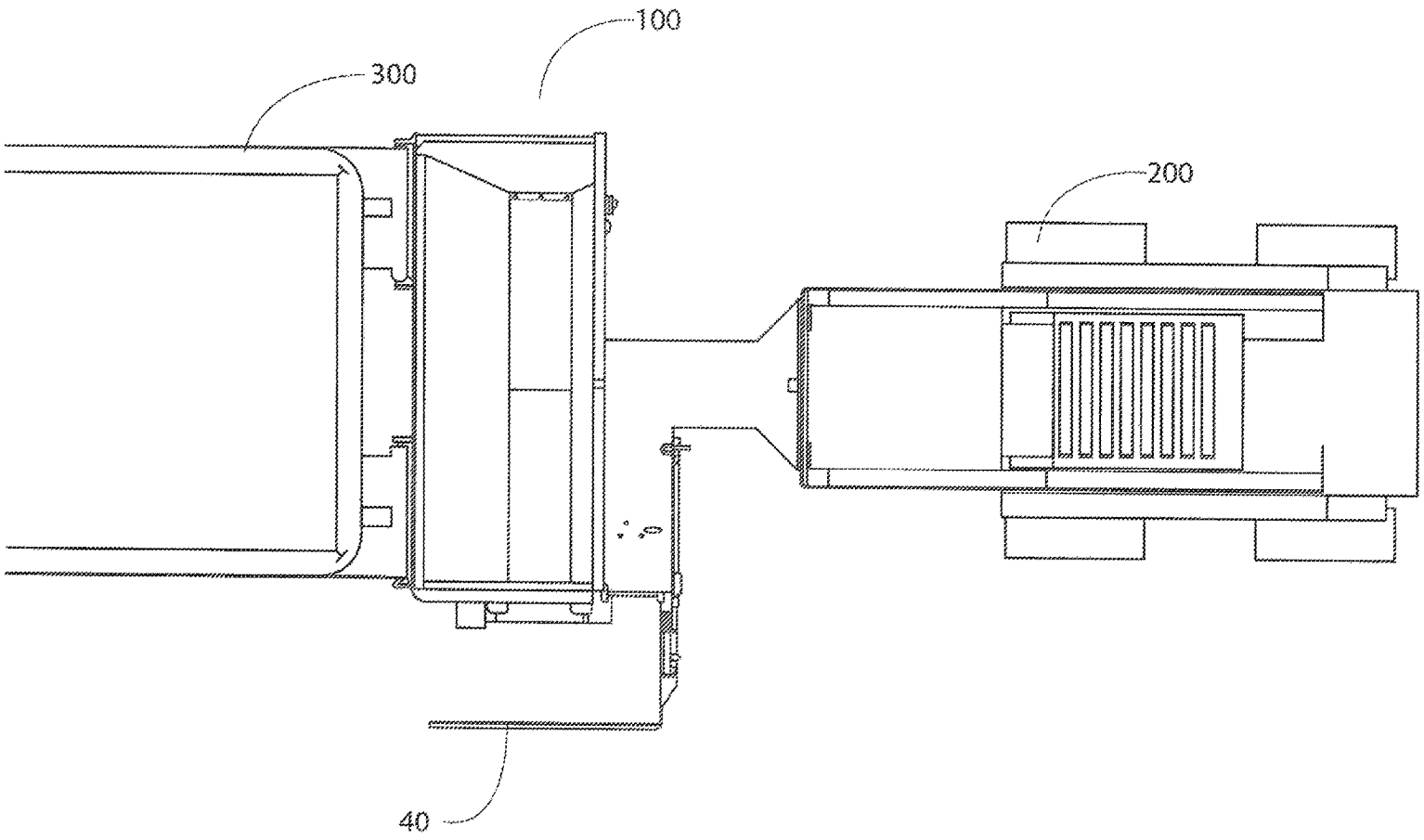
Figure 6
(Amended)

FLEXIBLE SKID STEER ATTACHMENT DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

None

FIELD OF INVENTION

The present invention relates to the field of road apparatuses, and more particularly to a flexible skid steer attachment device for paving shoulders and widening roads.

BRIEF DESCRIPTION OF THE DRAWINGS

FIG. 1 illustrates a front perspective view of an exemplary embodiment of a flexible skid steer road widening and shouldering attachment device attached to a skid steer with spreader system extended.

FIG. 2a illustrates a back perspective view of an exemplary embodiment of a flexible skid steer road widening and shouldering attachment device attached to a skid steer.

FIG. 2b illustrates a back perspective view of an exemplary embodiment of a flexible skid steer road widening and shouldering attachment device attached to a skid steer with spreader system extended.

FIG. 3 illustrates a back perspective view of an exemplary embodiment of a flexible skid steer road widening and shouldering attachment device attached to a skid steer and positioned behind a truck.

FIG. 4 is a side view showing the spreader system of an exemplary embodiment of a flexible skid steer road widening and shouldering attachment device attached to a skid steer and positioned behind a truck.

FIG. 5 is a side view of an exemplary embodiment of a flexible skid steer road widening and shouldering attachment device attached to a skid steer and positioned behind a truck.

FIG. 6 is a top view of an exemplary embodiment of a flexible skid steer road widening and shouldering attachment device attached to a skid steer and positioned behind a truck.

BACKGROUND

After-market attachments for road widening and shouldering are well-known in the construction industry.

U.S. Pat. No. 7,540,687 (Neumann '687) teaches a skid steer attachment for performing work in confined areas (e.g., road shoulders, trenches). The attachment disclosed in Neumann '687 is comprised of a compact frame adapted to support a hopper; a conveyer system; a spreader system; a spreader system angular adjustment; a hydraulic system; wheels; front contact rollers, which contact the back wheels of a dump truck; and a universal mounting plate. This device has enjoyed an extensive market presence and improvements have been made to further increase its utility and durability.

A limitation of Neumann '687 was that the conveyer belt system would become misaligned due to the pressure from debris coming in contact with the belt over time, as well as from the motion of the vehicle. The conveyer belt was required to be realigned by running the hydraulics and lifting, then realigning, the flashing between the hopper and conveyer belt. The belt would then realign itself.

A further limitation of the device disclosed in Neumann '687 is that it has to be disassembled before being placed on a trailer. The front rollers of the device have to be manually removed, causing time delays for disassembly and reassembly.

The hopper further includes an additional wall which is steered to the hopper on the side opposite the spreader system.

The skid steer attachment disclosed by Neumann '687 has enjoyed a wide market, and experience with the device has led to improvements resulting in a highly resilient and more portable attachment as disclosed herein.

SUMMARY OF THE INVENTION

The present invention is a flexible skid steer road widening and shouldering attachment device with an adjustable spreader system which gives the operator precise control over the placement of debris. The flexible skid steer road widening and shouldering attachment device disclosed herein is an improved version of the attachment disclosed by U.S. Pat. No. 7,540,687 (Neumann '687). The present invention is comprised of improved support components, an improved hopper design that optimizes the angle of deflection for debris, design dimensions and reduced sized rollers that eliminate the need for disassembly of the device for transport, a hopper deflection component, and a shortened flap design. Additionally, two tandem casters are used to more equally distribute the weight of the apparatus reducing the number of casters needed.

DETAILED DESCRIPTION OF INVENTION

For the purpose of promoting an understanding of the present invention, references are made in the text to exemplary embodiments of a flexible skid steer road widening and shouldering attachment device, only some of which are described herein. It should be understood that no limitations on the scope of the invention are intended by describing these exemplary embodiments. One of ordinary skill in the art will readily appreciate that alternate but functionally equivalent components, component placement, materials, and dimensions may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

FIG. 1 illustrates a front perspective view of an exemplary embodiment of flexible skid steer road widening and shouldering attachment device 100 attached to skid steer 200.

Attachment device 100 is comprised of support frame 10 adapted to support hopper 20, conveyer system 30, spreader system 40, hydraulic system 50 (not visible) and universal mounting plate 60.

In the embodiment shown, support frame 10 further includes support brackets 15a, 15b which add additional structural support to support frame 10. Support brackets 15a, 15b reinforce support frame 10 preventing universal mounting plate 60 from cracking where welded to support frame 10. Support bracket 15b may also serve as a step to aid the user in climbing into skid steer 200.

In the embodiment shown, support brackets 15a, 15b provide a more equal weight distribution and larger surface area on which to distribute the weight of support frame 10 than a mounting plate alone.

Hopper 20 is comprised of walls 22a, 22b, 22c, 22d angled inward to facilitate the movement of debris (e.g., gravel) onto conveyer system 30 which makes up the bottom of hopper 20. Conveyer system 30 rinses debris away from wall 22a of hopper 20 and toward spreader system 40. In the embodiment shown, conveyer system 30 is comprised of conveyer belt 35 and a plurality of rollers that are horizontally aligned beneath the lower opening of hopper 20.

In the embodiment shown, walls 22a, 22b, 22d of hopper 20 are gently angled toward conveyer belt 35 which slows the speed and force at which debris is pushed onto conveyer belt 35 decreasing the chance that the weight of the debris will force conveyer belt 35 off its rollers.

In an exemplary embodiment, wall 22c is substantially vertical relative to conveyer belt 35 (at an approximate 90 degree angle) to facilitate attachment of hopper 20 to support frame 10. Walls 22b, 22a and 22d are all placed at varying angles ranging from 100 to 170 degrees (as measured from a point on a horizontal plane inside hopper 20) to deflect debris onto conveyor belt 35.

FIG. 1 also illustrates vertical drop component 18 which deflects debris from walls 22a, 22b, 12d vertically onto conveyer belt 35, rather than laterally, so as not to cause pressure on the conveyer belt 35 leading to misalignment over time.

In the embodiment shown, conveyer belt 35 further includes a pulley *16* that is at least 2 inches wider than conveyer belt 35 to prevent conveyer belt 35 from moving off the edge of the pulley *16*. *The pulley 16 is concealed by a guard 17 in FIG. 1, but is partially visible in FIGS. 2b and 3.* This design modification substantially decreases delay resulting from malfunction.

In other embodiments, conveyer system 30 may be replaced with another means for moving debris from hopper 20 out toward spreader system 40. For example, chains may be used to displace debris from hopper 20. Conveyer belt 35 may be any functionally equivalent apparatus known in the art including, but not limited to a chain conveyer, screw conveyer, and any pneumatic, flexible, and vibrating system.

In the embodiment shown, attachment device 100 is approximately 125 inches wide, approximately 97 inches long, and approximately 32 inches high (top of hopper 20). The dimensions of attachment device 100 allow it to be pulled by a pick-up truck or transported by any common-width vehicle, avoiding the need for disassembly or a specialty width vehicle. In addition, attachment device 100 does not require an over-width permit for transportation or operation. In various embodiments, attachment device 100 has a width ranging from 100 inches to 170 inches, a length ranging from 75 inches to 175 inches and a height ranging from 28 inches to 58 inches.

In the embodiment shown, spreader system 40 is extended. Spreader system 40 is comprised of two walls 42a, 42b which are formed at a right angle. When spreader system 40 is extended, conveyer system 30 carries debris out of hopper 20. As skid steer 200 pushes attachment device 100, spreader system 40 spreads the debris dropped into hopper 20 by truck 300 (not shown). In the embodiment shown, spreader system 40 can be extended to disperse debris over widths of 0 to 7 feet. In one embodiment, spreader system 40 can create a shoulder ranging from 0 to 4 feet 6 inches.

In other embodiments, attachment device 100 includes two spreader systems, one located on each side of attachment device 100.

Also visible are casters 75a, 75b which are secured to the bottom of attachment device 100 aiding in the movement and maneuverability of attachment device 100 when shouldering around obstacles (e.g., mailboxes, driveway approaches, street signs, intersections, cul-de-sacs, guard rails). In the embodiment shown, casters 75a, 75b are comprised of steel polyurethane plastic and are solidly constructed (i.e., having no air cavity). It has been demonstrated that this construction is superior in performance to air-filled casters because of the added strength and durability to support the weight.

In the embodiment shown, casters 75a, 75b are attached to a plate on the bottom of the first end of attachment device 100 and protrude no more than 14 inches past the frame of attachment device 100.

In the embodiment shown, attachment device 100 further includes front rollers 80a, 80b which contact the back tires of truck 300 when attachment device 100 is receiving debris from the bed of truck 300.

FIG. 2a illustrates a back perspective view of an exemplary embodiment of flexible skid steer road widening and shouldering attachment device 100 attached to skid steer 200 with spreader system 40 in a partially open position. Visible is hydraulic system 50 which extends and closes spreader system 40. Hydraulic system 50 is also used to drive conveyer system 40.

Attachment device 100 further includes tie-downs 70a, 70b, 70c, 70d (70d not visible) for securing attachment device 100 during transport. In various embodiments, attachment device 100 may include a smaller or greater number of tie-downs in varying locations or similar components which can be used to secure attachment device 100 during transport.

In the embodiment shown, skid steer 200 may be used to lift and tilt hopper 20 to place debris in front of attachment device 100.

FIG. 2b illustrates a back perspective view of an exemplary embodiment of flexible skid steer road widening and shouldering attachment device 100 attached to skid steer 200 with spreader system 40 extended. The slope of spreader system 40 may be adjusted to create the desired shouldering angle.

FIG. 3 illustrates a back perspective view of an exemplary embodiment of flexible skid steer road widening and shouldering attachment device 100 attached to skid steer 200 and positioned behind truck 300. Skid steer 200 pushes attachment device 100 against truck 300 as truck 300 moves forward. Truck 300 dumps debris directly into hopper 20 of attachment device. Conveyer system 30 moves the debris from hopper 20 out to spreader system 40. As attachment device 100 moves, spreader system 40 spreads the debris allowing precise control over the placement of the debris.

In the embodiment shown, truck 300, attachment device 100 and skid steer 200 is capable of dispersing a 20-ton truckload of gravel in minutes resulting in a perfect shoulder.

FIG. 4 is a side view showing spreader system 40 of an exemplary embodiment of flexible skid steer road widening and shouldering attachment device 100 attached to skid steer 200 and positioned behind truck 300.

FIG. 5 is a side view of an exemplary embodiment of flexible skid steer road widening and shouldering attachment device 100 attached to skid steer 200 and positioned behind truck 300.

FIG. 6 is a top view of an exemplary embodiment of flexible skid steer road widening and shouldering attachment device 100 attached to skid steer 200 and positioned behind truck 300.

What is claimed is:

1. A [highly resilient] skid steer attachment for a skid steer comprised of:

a support frame [supported by at least two support brackets] *having a first end, a second end, a first side, and a second side opposite said first side*;

a hopper having [four] *a plurality of* angled walls for receiving debris at an angle of deflection which minimizes the impact of debris on a conveyer belt;

wherein one of said [four] angled walls is vertical relative to a horizontal plane;

wherein [three] *a plurality* of said [four] angled walls further include a vertical deflection component *oriented vertically* for directing debris downward;

a conveyor system comprised of a conveyer belt and a pulley, said pulley being at least two inches wider than said conveyer belt;

at least one [hydraulic] *power* system for powering said conveyor system;

a spreader system;

a plurality of tandem casters rotatably attached at [a] *said* first end of said support frame, [said plurality of tandem casters comprised of steel polyurethane plastic];

at least one contact roller rotatably attached to said first end of said support frame; and a universal mounting plate attached at [a] *said* second end of the support frame in a manner that allows said mounting plate to be engaged by a skid steer.

[2. The highly resilient skid steer attachment for a skid steer of claim 1 further including a second spreader system.]

3. The [highly resilient] skid steer attachment for a skid steer of claim 1 wherein said angled walls have [varying] *different* slopes *ranging from 100 to 170 degrees as measured from a point on a horizontal plane*.

4. The [highly resilient] skid steer attachment for a skid steer of claim 1 wherein said angled walls have angles [ranges] *ranging* from 90 to 170 degrees relative to a horizontal plane.

[5. The highly resilient skid steer attachment for a skid steer of claim 1 wherein at least one of said angle wails is vertical relative to a horizontal plane.]

6. The [highly resilient] skid steer attachment for a skid steer of claim 1 further including a width ranging from 100 inches to 170 inches, a length ranging from 75 inches to 175 inches, and a height ranging from 28 inches to 58 inches.

7. The [highly resilient] skid steer attachment for a skid steer of claim 1 wherein said spreader system is comprised of two walls formed at a right angle.

8. The [apparatus] *skid steer attachment for a skid steer* of claim 1 which further includes a spreader system angular adjustment for adjusting the slope of said spreader system when extended.

9. The [apparatus] *skid steer attachment for a skid steer* of claim 1 wherein said spreader system is capable of creating shoulders ranging from 0 to 7 feet wide.

10. A skid steer attachment device comprising:

a support frame;

a hopper with a plurality of angled walls, wherein at least one of said plurality of angled walls is vertical relative to a horizontal plane, and *wherein at least one of said plurality of angled walls* further includes a vertical deflection component configured to direct debris *vertically* downward;

a conveyor system including a conveyer belt [and at least one pulley wherein the at least one pulley is wider than said conveyer belt];

*a pulley that is at least 2 inches wider than the conveyer belt and configured to prevent the conveyer belt from moving off an edge of the pulley;* at least one system for powering said conveyor system;

a spreader system comprising a first wall extending at a first angle from the support frame and a second wall extending at a second angle from the first wall;

a plurality of tandem casters rotatably attached at a first end of said support frame;

at least one contact roller rotatably attached to said first end of said support frame configured for engagement with at least one rear wheel of a vehicle; and a universal mounting plate attached at a second end of the support frame configured for attachment to a skid steer.

11. The skid steer attachment device of claim 10 wherein said plurality of angled walls has angles ranging from 90 to 170 degrees relative to a horizontal plane.

12. The skid steer attachment device of claim 11 wherein the spreading system includes [a] *an adjustable* slope and an extendable spreader for angular adjustment configured to adjust the slope of said spreader when extended.

13. The skid steer attachment device of claim 12 further including a width ranging from 100 inches to 170 inches, a length ranging from 75 inches to 175 inches, and a height ranging from 28 inches to 58 inches.

14. The skid steer attachment device of claim 10 wherein said at least one system for powering said conveyor system comprises a hydraulic system.

*15. A highly resilient skid steer attachment for a skid steer comprised of:*

*a support frame supported by at least two support brackets;*

*a hopper having four angled walls for receiving debris at an angle of deflection which minimizes the impact of debris on a conveyer belt;*

*wherein at least one of said four angled walls is vertical relative to a horizontal plane;*

*wherein at least two of said four angled walls further include a vertical deflection component vertically oriented for directing debris downward;*

*a conveyer system comprised of a conveyer belt and a pulley, said pulley being at least two inches wider than said conveyer belt;*

*at least one hydraulic system for powering said conveyer system;*

*a spreader system comprising a first wall extending at a first angle from the support frame and a second wall extending at a second angle from the first wall;*

*a plurality of casters rotatably attached at a first end of said support frame;*

*at least one contact roller rotatably attached to said first end of said support frame configured for engagement with at least one rear wheel of a vehicle; and*

*a universal mounting plate attached at a second end of the support frame in a manner that allows said mounting plate to be engaged by a skid steer.*

*16. The highly resilient skid steer attachment for a skid steer of claim 15 wherein said angled walls have varying slopes.*

*17. The highly resilient skid steer attachment for a skid steer of claim 15 wherein the at least one contact roller is configured for engagement with at least one rear wheel of said vehicle.*

*18. The highly resilient skid steer attachment for a skid steer of claim 15 wherein each of said at least one angled wall has a different angle ranging from 90 to 170 degrees relative to a horizontal plane.*

*19. The highly resilient skid steer attachment for a skid steer of claim 15 wherein said plurality of tandem casters is comprised of steel polyurethane plastic.*

*20. The highly resilient skid steer attachment for a skid steer of claim 15 wherein the second wall of the spreader system extends at a right angle from the first wall of the spreader system.*

*21. The highly resilient skid steer attachment for a skid steer of claim 15 further comprising a spreader system angular adjustment for adjusting the slope of said spreader system when extended.*

*22. The highly resilient skid steer attachment for a skid steer of claim 15 wherein the at least two support brackets extend at an angle from the support frame to the universal mounting plate.*

* * * * *